United States Patent
Dabak

(10) Patent No.: US 10,514,945 B2
(45) Date of Patent: Dec. 24, 2019

(54) HOST-BASED VIRTUAL MACHINE INTROSPECTION WITH DYNAMIC GUEST ASSISTANCE

(71) Applicant: NICIRA, INC., Palo Alto, CA (US)

(72) Inventor: Prasad Dabak, Pune (IN)

(73) Assignee: NICIRA, INC., Palo Alto, CA (US)

(*) Notice: Subject to any disclaimer, the term of this patent is extended or adjusted under 35 U.S.C. 154(b) by 136 days.

(21) Appl. No.: 15/890,382

(22) Filed: Feb. 7, 2018

(65) Prior Publication Data

US 2019/0129741 A1 May 2, 2019

(30) Foreign Application Priority Data

Oct. 31, 2017 (IN) .............................. 201741038697

(51) Int. Cl.
| | |
|---|---|
| *G06F 9/455* | (2018.01) |
| *G06F 21/52* | (2013.01) |
| *G06F 21/53* | (2013.01) |
| *G06F 21/62* | (2013.01) |

(52) U.S. Cl.
CPC .......... *G06F 9/45558* (2013.01); *G06F 21/52* (2013.01); *G06F 21/53* (2013.01); *G06F 21/629* (2013.01); *G06F 2009/45575* (2013.01); *G06F 2009/45583* (2013.01); *G06F 2009/45591* (2013.01)

(58) Field of Classification Search
CPC ........ G06F 21/53; G06F 21/629; G06F 21/52; G06F 2009/45575; G06F 2009/45583; G06F 2009/45591
See application file for complete search history.

(56) References Cited

U.S. PATENT DOCUMENTS

| | | | | |
|---|---|---|---|---|
| 7,996,836 | B1* | 8/2011 | McCorkendale | G06F 21/53 713/164 |
| 8,397,242 | B1* | 3/2013 | Conover | G06F 8/52 718/1 |
| 8,448,165 | B1* | 5/2013 | Conover | G06F 9/45558 717/174 |
| 8,813,233 | B1* | 8/2014 | Wilson | G06F 21/577 718/1 |
| 2009/0241109 | A1* | 9/2009 | Vandegrift | G06F 9/445 718/1 |
| 2009/0300076 | A1* | 12/2009 | Friedman | G06F 11/3664 |

(Continued)

*Primary Examiner* — Benjamin C Wu
(74) *Attorney, Agent, or Firm* — Su IP Consulting

(57) ABSTRACT

A hypervisor monitors for an initialization of a guest kernel running on a virtual machine implemented by the hypervisor. When the initialization of the guest kernel is detected, the hypervisor pauses a virtual processor of the virtual machine, locates a guest kernel image of the guest kernel in guest memory, locates a kernel function in the guest kernel image, inserts a breakpoint on the guest kernel function, resumes the virtual processor and monitors for a breakpoint instruction. After detecting the breakpoint instruction, the hypervisor gathers guest context by examining the guest memory and guest registers, pauses the virtual processor, constructs and injects a code gadget configured to run in the virtual machine, diverts the virtual processor to execute the code gadget, which causes the virtual processor to call the hypervisor at the end of executing the code gadget, and returns the virtual processor to execute the guest kernel function.

20 Claims, 7 Drawing Sheets

(56) References Cited

U.S. PATENT DOCUMENTS

| | | | |
|---|---|---|---|
| 2013/0297849 A1* | 11/2013 | Wagner | G06F 12/10 711/6 |
| 2014/0068341 A1* | 3/2014 | Martineau | G06F 11/34 714/38.11 |
| 2014/0189687 A1* | 7/2014 | Jung | G06F 9/45558 718/1 |
| 2015/0033227 A1* | 1/2015 | Lin | G06F 21/55 718/1 |
| 2015/0046921 A1* | 2/2015 | Allen | G06F 9/45558 718/1 |
| 2015/0121135 A1* | 4/2015 | Pape | G06F 11/1484 714/15 |
| 2016/0224789 A1* | 8/2016 | Feroz | G06F 21/566 |
| 2016/0241573 A1* | 8/2016 | Mixer | H04L 63/1416 |
| 2018/0267880 A1* | 9/2018 | Tsirkin | G06F 11/362 |

* cited by examiner

HOST-BASED VIRTUAL MACHINE INTROSPECTION WITH DYNAMIC GUEST ASSISTANCE

RELATED APPLICATIONS

Benefit is claimed under 35 U.S.C. 119(a)-(d) to Foreign Application Serial No. 201741038697 filed in India entitled "HOST-BASED VIRTUAL MACHINE INTROSPECTION WITH DYNAMIC GUEST ASSISTANCE", on Oct. 31, 2017, by NICIRA, INC., which is herein incorporated in its entirety by reference for all purposes

BACKGROUND

Host-based virtual machine introspection (VMI) is a technique that enables monitoring virtual machines at the hypervisor layer. One of the challenges of host-based VMI is the lack of guest context. For example, a host can see network packets sent by a virtual machine, but it lacks the guest context about the process in the guest (virtual machine) that sent the network packets. Similarly, the host can see the disk block being read or written to by the virtual machine, but it lacks the guest context as to which file the disk block belongs to and which process in the guest accessed that file.

Another challenge of host-based VMI is the lack of ability to perform an action that is purely a guest construct. For example, a host can provide protection for the guest physical pages (typically code pages) by marking them as non-writable in an extended page table. Whenever the guest writes to such a page, it would result in an extended page table (EPT) violation that the hypervisor would handle and take an appropriate security action. However, the host cannot lock the guest physical page to ensure the mapping between a corresponding guest virtual page and the guest physical page stays constant in the guest.

These challenges can be solved by having an agent running in a guest that bridges the guest context gap and coordinate with a host-based VMI application. For example, an agent could intercept a "socket connect" call in the guest, capture the guest context (e.g., process information), and send it to the VMI application. When the VMI application sees a contemporary network packet, it can correlate the network packet with the process information received earlier. In another example, an agent can intercept a "module load" function in the guest, lock the guest physical pages corresponding to the code of a newly loaded module, and send the guest physical page numbers to the VMI application. The VMI application in turn can mark those pages as non-writable in an extended page table.

However, introducing an agent has its own set of security challenges. A malware running in a guest may disable the agent. A malware can do control flow attack on the agent and fool the host-based VMI application. The communication channel between the agent and host may be compromised. Thus, it is an imperfect solution since the VMI application relies on the agent running in the virtual machine and trust that it functions normally.

There are also non-security or operational challenges for introducing an agent. An agent would need to be installed or updated in every virtual machine. The interception capability of the agent is limited to what a guest operating system offers. Operating systems like Windows® have a kernel patch protection, also known as "PatchGuard," that prevents patching kernel. Hence, intercepting at arbitrary code locations in kernel is not possible.

DETAILED DESCRIPTION

Figure 1:
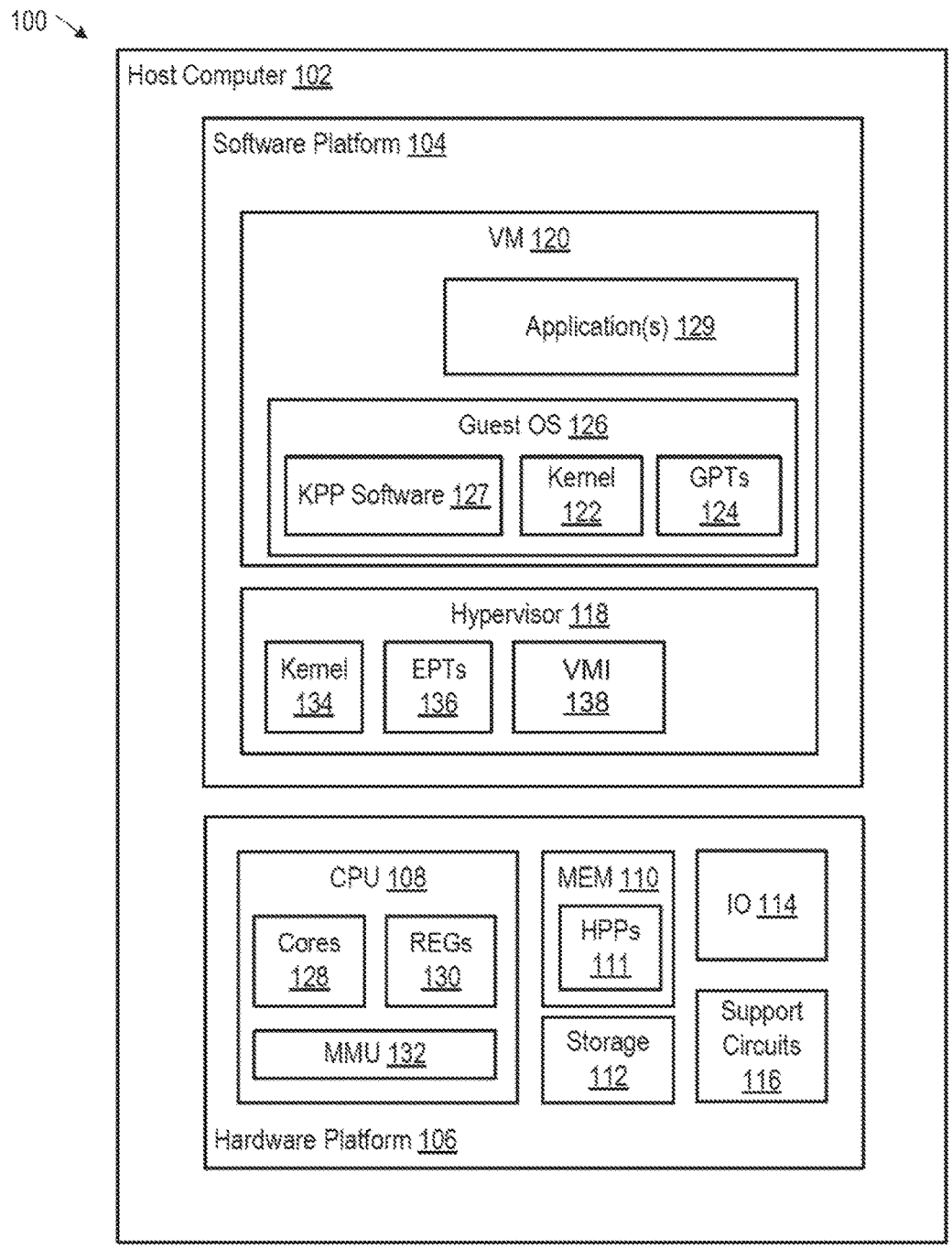
FIG. 1 illustrates is a block diagram depicting a virtualized computing system in some examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

In examples of the present disclosure, a hypervisor is provided with virtual machine introspection (VMI) capability. Such a "VMI hypervisor" resolves the lack of guest context by inserting breakpoints on functions of interest in a guest and reading guest memory and/or registers to parse parameters and/or operating system data structures. To perform an action that is purely a guest construct, the VMI hypervisor may dynamically construct and inject code gadgets in the guest and divert the guest's virtual processor to execute the code gadgets on an as-needed basis.

FIG. 1 is a block diagram illustrating a virtualized computing system 100 according to examples of the present disclosure. Virtualized computing system 100 includes a host computer 102 having a software platform 104 executing on a hardware platform 106. Hardware platform 106 may include conventional components of a computing device, such as a central processing unit (CPU) 108, main (system) memory 110, a secondary memory (storage) 112, input/output (I/O) devices 114, and various support circuits 116.

CPU 108 is configured to execute instructions, for example, executable instructions that perform one or more operations described herein and may be stored in main memory 110 and secondary memory 112. Main memory 110 is a device allowing information, such as executable instructions, virtual disks, configurations, and other data, to be stored and retrieved. Main memory 110 may include, for example, one or more random access memory (RAM) modules. Secondary memory 112 includes local storage devices (e.g., one or more hard disks, flash memory modules, solid state disks, and optical disks) and/or a storage interface that enables host computer 102 to communicate with one or more network data storage systems. Examples of a storage interface are a host bus adapter (HBA) that couples host computer 102 to one or more storage arrays, such as a storage area network (SAN) or a network-attached storage (NAS), as well as other network data storage systems. I/O devices 114 include conventional interfaces known in the art, such as one or more network interfaces. Support circuits 116 include conventional cache, power supplies, clock circuits, data registers, and the like.

CPU 108 includes one or more cores 128, various registers 130, and a memory management unit (MMU) 132. Each core 128 is a microprocessor, such as an x86 microprocessor or the like. Registers 130 include program execution registers for use by code executing on cores 128 and system registers for use by code to configure CPU 108. MMU 132 supports paging of main memory 110. Paging provides a "virtual memory" environment where a virtual address space is divided into pages, which are either stored in main memory 110 (e.g., host physical pages (HPPs) 111) or in secondary memory 112. "Pages" are individually addressable units of memory. Each page (also referred to herein as a "memory page") includes a plurality of separately addressable data words, each of which in turn includes one or more bytes. Pages are identified by addresses referred to as "page numbers." CPU 108 can support one or more page sizes. For example, modern x86 CPUs can support 4 kilobyte (KB), 2 megabyte (MB), 4 MB, and 1 gigabyte (GB) page sizes. Other CPUs may support other page sizes.

MMU 132 translates virtual addresses in the virtual address space into physical addresses of main memory 110. MMU 132 also determines access rights for each address translation. An executive (e.g., operating system, hypervisor, etc., or combination thereof) exposes a hierarchy of page tables to CPU 108 for use by MMU 132 to perform address translations. A page table hierarchy can be exposed to CPU 108 by writing pointer(s) to control registers and/or control structures accessible by MMU 132. Page tables can include different types of paging structures depending on the number of levels in the hierarchy. A paging structure includes entries, each of which specifies an access policy and a reference to another paging structure or to a memory page. The access policy for a page can include read/write/execute permissions, user/supervisor permissions, and the like.

CPU 108 can include hardware-assisted virtualization features, such as support for hardware virtualization of MMU 132. For example, modern x86 processors commercially available from Intel Corporation include support for MMU virtualization using extended page tables (EPTs). Likewise, modern x86 processors from Advanced Micro Devices, Inc. include support for MMU virtualization using nested page tables (NPTs). In a virtualized computing system, a guest operating system (OS) in a virtual machine (VM) maintains guest page tables (GPTs) 124 for translating guest virtual addresses to addresses for a virtual memory provided by the hypervisor (referred to as guest physical addresses). The hypervisor maintains EPTs that translate guest-physical addresses to physical addresses for main memory 110 (referred to as host physical addresses or machine addresses). Each of the guest OS and the hypervisor exposes the guest paging structures and the EPTs, respectively, to the CPU 108. MMU 132 translates virtual addresses to host-physical addresses by walking the guest page structures to obtain guest-physical addresses, which are used to walk the EPTs to obtain host-physical addresses.

Software platform 104 includes a virtualization layer that abstracts processor, memory, storage, and networking resources of hardware platform 106 into one or more VMs that run concurrently on host computer 102. The VMs run on top of the virtualization layer, referred to herein as a hypervisor, which enables sharing of the hardware resources by the VMs. In the example shown, software platform 104 includes hypervisor 118 that supports one or more VMs 120. One example of hypervisor 118 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Although only one VM 120 is shown in the example, hypervisor 118 can concurrently support multiple VMs. Hypervisor 118 includes a kernel 134. Kernel 134 maintains EPTs 136 on behalf of its VM(s), which are exposed to CPU 108. Hypervisor 118 includes VMI capabilities 138, which are discussed below.

Each VM supported by hypervisor 118 includes guest software that runs on the virtualized resources supported by hardware platform 106. In the example shown, the guest software of VM 120 includes a guest OS 126 and one or more application(s) 129. Guest OS 126 can be any commodity OS known in the art, such as such as Linux®, Microsoft Windows®, Mac OS®, or the like. In examples where guest OS 126 is a Windows® operating system, it includes a kernel 122 (also referred to as "guest kernel 122") and kernel patch protection (KPP) software 127. KPP software 127 is configured to periodically check that code and data structures of guest kernel 122 ("protected code" and "protected data structures") have not been modified. If KPP software 127 detects a modification of the protected code/ data structures, KPP software 127 initiates a protection procedure (e.g., performs a bug check and shuts down guest OS 126). Guest OS 126 supports execution of various software, including application(s) 129. Guest OS 126 maintains GPTs 124 for mapping virtual addresses to guest-physical addresses.

Hypervisor 118 may patch guest kernel 122 in a manner that is undetectable by KPP software 125. In general, hypervisor 118 presents patched kernel code in the execution stream and original (unpatched) kernel code in the data stream. Since the patched kernel code is in the execution stream, guest OS 126 will execute the patched kernel code. Any software in guest OS 126 that desires to read the kernel code is presented the original kernel code. In this manner, when KPP software 127 executes read operations to verify the kernel code, KPP software 127 is presented with the original kernel code. In one example, hypervisor 118 implements this kernel patch transparency by modifying entries in EPTs 136 to cause an exception to hypervisor 118 when software in VM 120 attempts to read code of guest kernel 122 that has been patched. When handling the exception, hypervisor 118 emulates the read operation, but targets the original kernel code rather than the patched kernel code.

Figure 2:
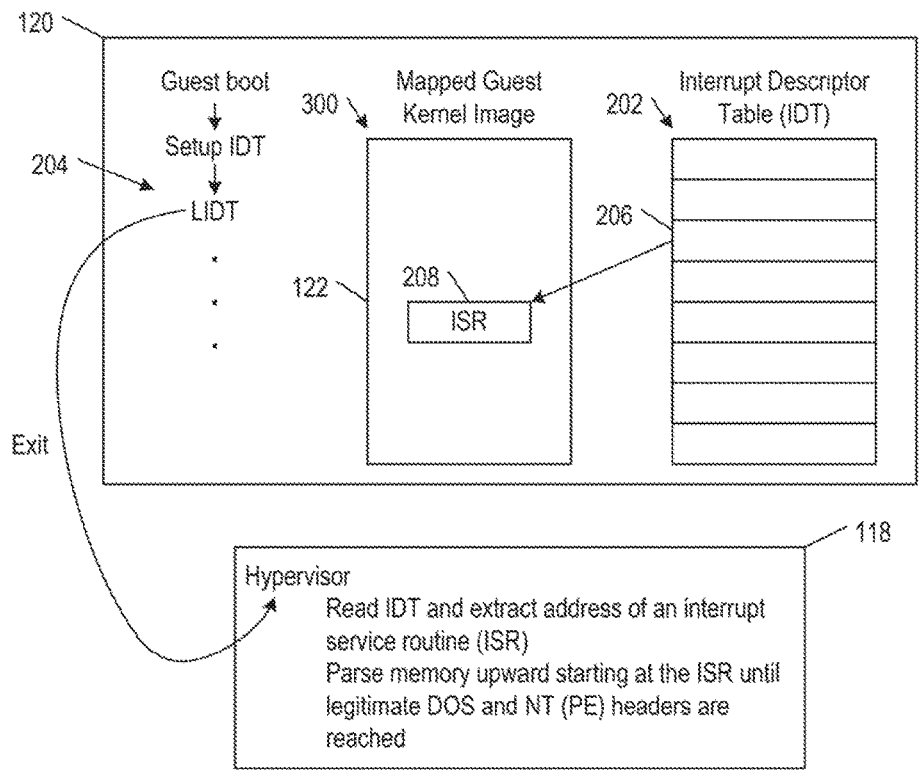
FIGS. 2, 3, and 4 are block diagrams illustrating a hypervisor with virtual machine introspection (VMI) capabilities ("VMI hypervisor") of FIG. 1 determining guest context by inserting breakpoints into functions of interest in a guest kernel in some examples of the present disclosure.

In some examples of the present disclosure, hypervisor 118 resolves the lack of guest context by inserting breakpoints on functions of interest in guest kernel 122. To insert a breakpoint on a guest kernel function of interest, hypervisor 118 first acquires the function's address in guest kernel 122. As illustrated in FIG. 2, hypervisor 118 takes an exit on instructions that typical OS's execute as part of their initialization. Taking the exit pauses the virtual processor of VM 120 (FIG. 1). For an x86/x64 system, guest kernel 122 may set up an interrupt descriptor table (IDT) 202 by executing a load IDT (LIDT) instruction 204 to load registers with the base address and the size of the IDT. Guest kernel 122 may set up model-specific registers (MSRs) for system calls that allow instructions like SYSENTER to execute system call handlers. Other trigger points may also be used to detect operating system initialization. Alternatively, guest OS 126 may include an early load agent whose job is to notify hypervisor 118 that the guest OS is ready for VMI and then exit immediately.

Figure 3:
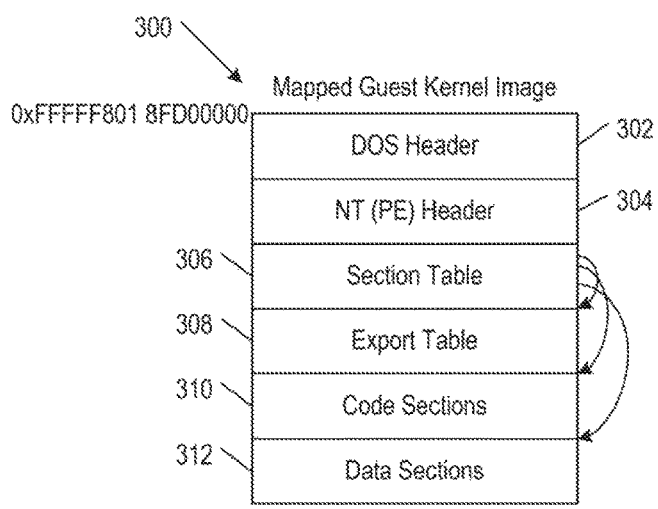

To find guest kernel 122 in the guest physical memory, hypervisor 118 reads IDT 202 or the system call MSRs and determines an interrupt handler address 206 or a system call handler address registered by the guest kernel. Based on the interrupt handler address 206 or the system call handler address, hypervisor 118 parses the mapped kernel address space, finds headers, and determines the guest kernel's base address and size from the headers that delineate the mapped kernel address space in the guest physical memory. As illustrated in FIG. 3, for a Windows® OS, an image 300 of guest kernel 122 in guest physical memory may be in the portable executable (PE) format. Guest kernel image 300 includes a DOS header 302, an NT (PE) header 304, a section table 306, an export table 308, code section(s) 310, and data section(s) 312. Hypervisor 118 may first find DOS header 302, which has a pointer to NT (PE) header 304, which stores the guest kernel's base address and size that identify the mapped kernel address space.

Figures 4, 5:
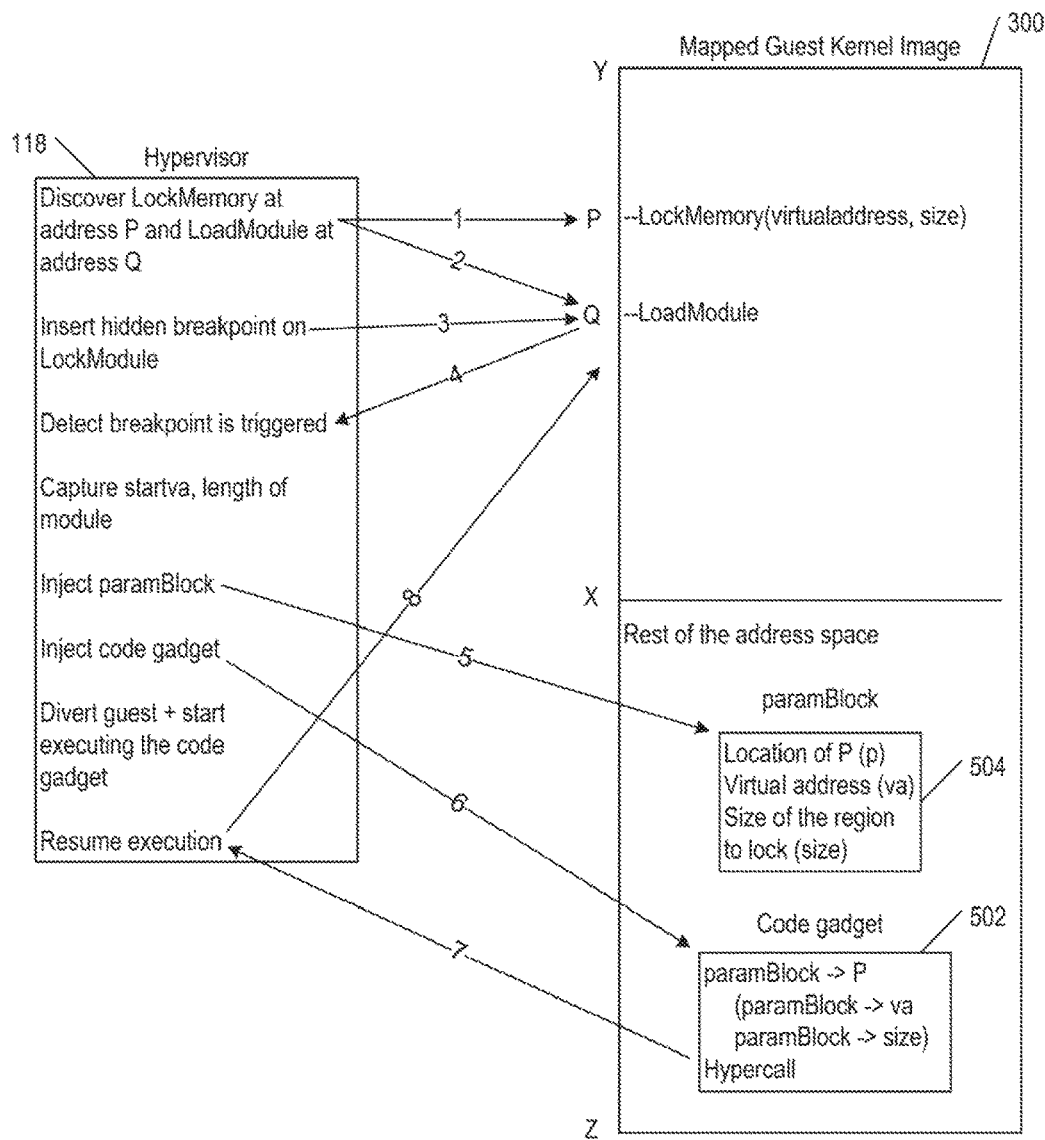
FIG. 5 is a block diagram illustrating the VMI hypervisor of FIG. 1 dynamically constructing and injecting code gadgets in a guest and diverting the guest's virtual processor to execute the gadgets on an as-needed basis in some examples of the present disclosure.

If guest kernel 122 exports the guest kernel function of interest, hypervisor 118 may find section table 306, which has the address of export table 308. Hypervisor 118 then parses export table 308 to find the address of the function of interest. FIG. 4 illustrates export table 308 with the function names and relative addresses in the mapped kernel address space.

If guest kernel 122 does not export the guest kernel function of interest, hypervisor 118 may locate the function of interest by performing pattern matching in the guest physical memory. Alternatively, hypervisor 118 may integrate with a symbol server if the OS vendor supports symbol server. For example, hypervisor 118 may use a symbol server from Microsoft to find symbol addresses for internal functions for a Windows® guest kernel 122.

Once hypervisor 118 locates the guest kernel function of interest, the hypervisor puts a hidden breakpoint on the function of interest. To circumvent OS's with kernel patch protection, the breakpoint may be "hidden" so hypervisor 118 presents different host physical pages to VM 120 (FIG. 1) depending if the guest physical page access is in a "read path" or a "execute path." In the execute path, hypervisor 118 presents a page with the breakpoint instruction (e.g., in an x86/x64 system, it is INT 3 instruction with opcode 0xC3). in the read path, hypervisor 118 presents the page with the original byte.

Whenever the virtual processor in VM 120 executes the guest kernel function of interest, hypervisor 118 would intercept the breakpoint instruction and then synchronously gather the guest context from guest registers and/or guest physical memory implemented on host computer 102. This may also require parsing OS specific data structures to gather more context. For example, in a Microsoft Windows® OS, a pointer at address GS:[188h] of the segment register GS points to the KTHREAD/ETHREAD data structure of the currently running thread, and a pointer at address KTHREAD:[220h] of the KTHREAD/ETHREAD structure points to the KPROCESS/EPROCESS data structure of the current process context. Using this information, hypervisor 118 may determine process context in which the breakpoint instruction was triggered.

To perform an action that is purely a guest construct, hypervisor 118 may dynamically constructs and injects code gadgets in VM 120 and diverts the virtual processor of the VM to execute the code gadgets on an as-needed basis. To inject and execute the code gadgets, hypervisor 118 acquires a virtual address range in VM 120.

In one example, hypervisor 118 finds unused space in code sections 310 (FIG. 3) in guest kernel image 300 (FIG. 3). Code sections 310 of the binaries on disk are typically sector aligned (512 bytes) but they are page aligned (4096 bytes) when they are brought into main memory. Hence, there may be unused code space in guest kernel image 300 where hypervisor 118 may inject the code gadgets. If the unused code space is not sufficient, hypervisor 118 may inject a small code gadget in unused code space. This code gadget allocates a virtual address range in the guest virtual memory using OS application programming interfaces (APIs), and hypervisor 118 uses that allocated virtual address range for injecting the subsequent code gadgets.

In another example, guest OS 126 includes an early load agent that allocates a virtual address range, informs hypervisor 118 about it, and immediately exits. Hypervisor 118 uses this allocated virtual address range for injecting the code gadgets.

In an additional example, hypervisor 118 reserves certain guest physical pages so they are invisible to the guest. When injecting a code gadget, hypervisor 118 maps these guest physical pages into guest page tables, injects a code gadget in these pages, executes the gadget, and un-maps these pages from the guest page tables.

FIG. 5 demonstrates how a dynamic code gadget works. Assume hypervisor 118 first discovers a "LockMemory" function and a "LoadModule" function in guest kernel 122 in the same manner for discovering guest kernel functions of interest for inserting breakpoints. Hypervisor 118 inserts a hidden breakpoint in the "LoadModule" function in guest kernel 122. Assume a kernel calls the "LoadModule" function to load a new guest kernel module in guest kernel 122. Hypervisor 118 intercepts the breakpoint instruction on the LoadModule function. After the new module is loaded in memory, the LoadModule function returns. Hypervisor 118 then parses the returned value and/or OS specific data structures to determine the base address and the size of the new module. Hypervisor 118 then parses the mapped kernel address space and locates a code section 310 containing the code of new module.

To prevent malicious tampering of code section 310 of the new guest kernel module, hypervisor 118 injects a code gadget 502 in guest kernel 122 to call the LockMemory function. In some examples, code gadget 502 does not contain any relocation and hypervisor 118 generates a parameter block 504 to pass data to the code gadget Parameter block 504 identifies the address of the LockMemory function and the new guest kernel module's base address and size as parameters for the LockMemory function. Hypervisor 118 updates the instruction pointer for the virtual processor of VM 120 to point to the code gadget and releases control back to the VM. The virtual processor executes code gadget 502, which causes the virtual processor to execute instructions at the address in parameter block 504 with the parameters in the parameter block. This in turn causes the virtual processor to lock the guest physical pages with the code of the new module and then hypercall hypervisor 118 with the result at the end of execution. Hypervisor 118 may put traces on the locked guest physical pages to prevent tampering and then resume execution at a code location past the call to the LoadModule function.

Figure 6:
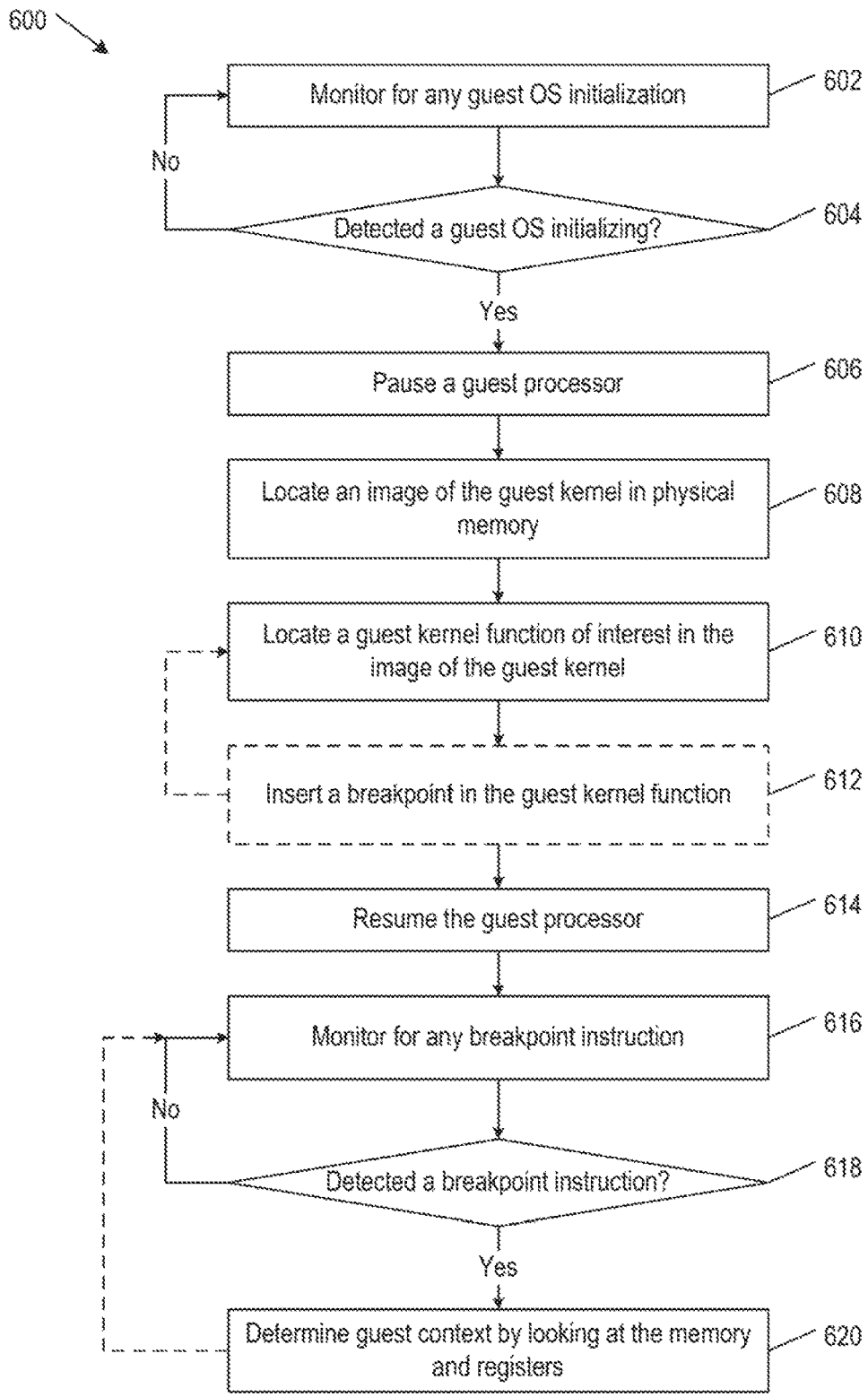
FIG. 6 is a block diagram illustrating a flowchart of a method for the VMI hypervisor of FIG. 1 to determine guest context in some examples of the present disclosure.

FIG. 6 is a block diagram illustrating a flowchart of a method 600 for hypervisor 118 (FIG. 1) to determine guest context in some examples of the present disclosure. Method 600, and any method described herein, may be implemented as instructions encoded on a computer-readable medium that is to be executed by a processor in a computer system. Method 600, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 600 may begin in block 602.

In block 602, hypervisor 118 monitors for any guest OS initialization. Block 602 may be followed by block 604.

In block 604, hypervisor 118 determines if a guest OS initializing (e.g., guest OS 126 in FIG. 1) is detected. If so, block 604 may be followed by block 606. Otherwise block 604 may loop back to block 602.

In block 606, hypervisor 118 takes an exit to pause the virtual processor of VM 120 (FIG. 1). Block 606 may be followed by block 608.

In block 608, hypervisor 118 locates a guest kernel image 300 (FIG. 3) in the guest physical memory. Block 608 may be followed by block 610.

In block 610, hypervisor 118 locates a guest kernel function of interest in guest kernel image 300. Block 610 may be followed by optional block 612.

In optional block 612, hypervisor 118 inserts a breakpoint on the guest kernel function of interest. Optional block 612 may be followed by block 614. Alternatively, optional block 612 may loop back to block 610 to locate another guest kernel function of interest.

In block 614, hypervisor 118 resumes the virtual processor of VM 120. Block 614 may be followed by block 616.

In block 616, hypervisor 118 monitors for any breakpoint instruction. Block 616 may be followed by block 618.

In block 618, hypervisor 118 determines if a breakpoint instruction is detected. If so, block 618 may be followed by block 620. Otherwise block 618 may loop back to block 616, In block 620, hypervisor 118 determines the guest context by examining the guest physical memory and guest registers. For example, hypervisor 118 may determine which process called the guest kernel function and correspond that process to contemporary network packets, disk reads, or disk writes. Block 620 may loop back to block 616 to detect another breakpoint instruction.

Figure 7:
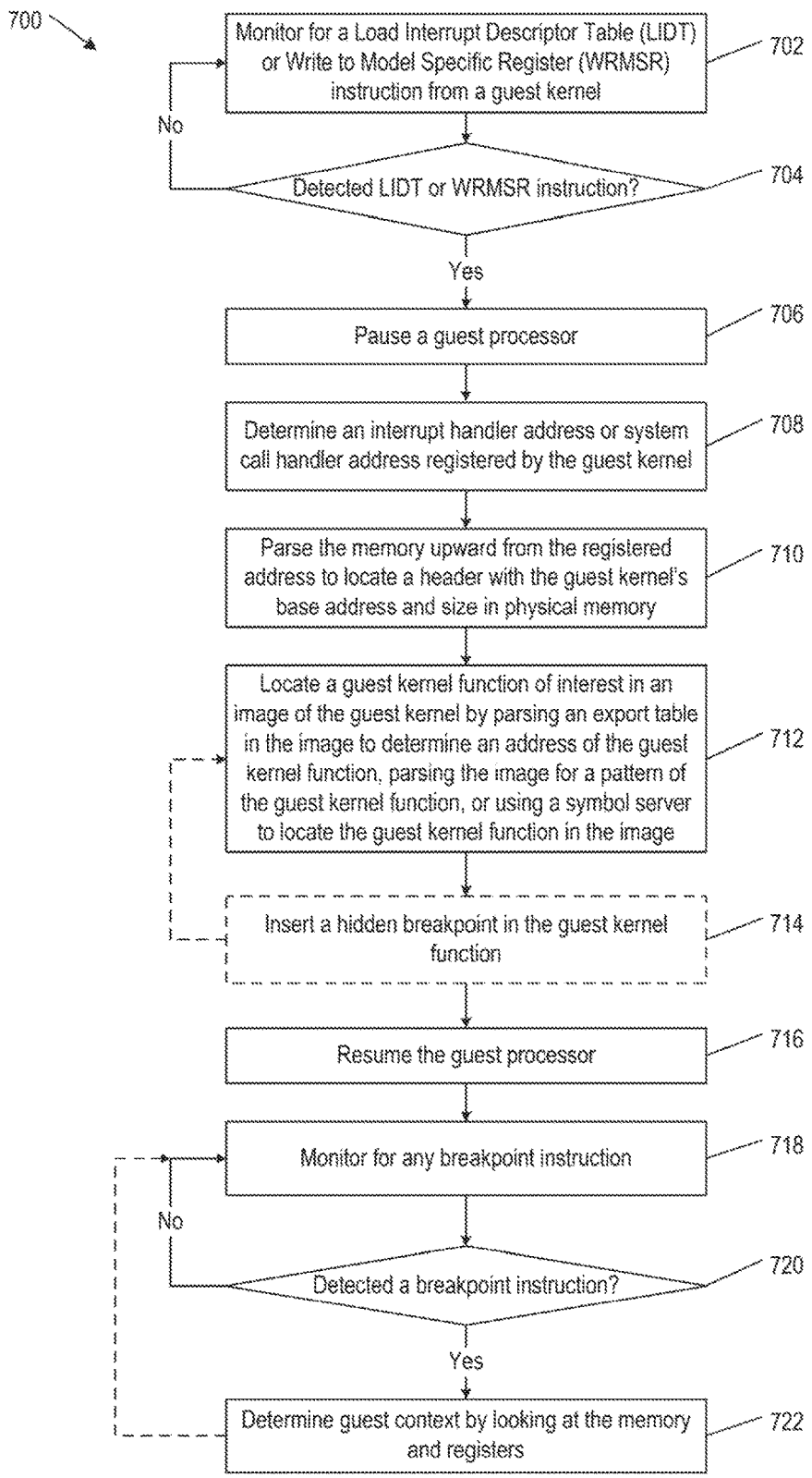
FIG. 7 is a block diagram illustrating a flowchart of a method that is an implementation of the method of FIG. 6 in some examples of the present disclosure.

FIG. 7 is a block diagram illustrating a flowchart of a method 700 for hypervisor 118 (FIG. 1) to determine guest context in some examples of the present disclosure. Method 700 illustrates one implementation of method 600 (FIG. 6). Method 700 may begin in block 702.

In block 702, hypervisor 118 monitors for any guest OS specific trigger point that indicates guest OS initialization. For example, hypervisor 118 monitors for a LIDT or WRMSR instructions from guest kernel 122 (FIG. 1). Block 702 may be followed by block 704.

In block 704, hypervisor 118 determines if a LIDT or WRMSR instruction is detected. If so, block 704 may be followed by block 706. Otherwise block 704 may loop back to block 702.

In block 706, hypervisor 118 takes an exit to pause the virtual processor of VM 120 (FIG. 1). Block 706 may be followed by block 708.

In block 708, hypervisor 118 determines an address 206 (FIG. 2) of an interrupt handler or an address of a system call handler registered by guest kernel 122. Hypervisor 118 may read an IDT or the system call MSRs to determine the interrupt handler address or the system call handler address. Block 708 may be followed by block 710.

In block 710, hypervisor 118 parses the guest physical memory upward from the registered address to locate headers and determine the base address and the size of guest kernel 122 that identify the mapped kernel address space. Block 710 may be followed by block 712.

In block 712, hypervisor 118 locates a guest kernel function of interest in guest kernel image 300 (FIG. 3). In one example, hypervisor 118 parses section table 306 (FIG. 3) in guest kernel image 300 to locate an export table 310, and then parses export table 310 to find the function of interest and its relative address in the guest kernel image. In another example, hypervisor 118 parses section table 306 to locate code sections 310 (FIG. 3). Hypervisor 118 then finds the function of interest by pattern matching. In a further example, hypervisor 118 uses a symbol server to find the address of the function of interest. Block 712 may be followed by optional block 714.

In optional block 714, hypervisor 118 inserts a "hidden" breakpoint in the guest kernel function of interest. As previously mentioned, hypervisor 118 presents one guest physical page for a read path and another guest physical page for an execute path to circumvent any kernel patch protection. Optional block 714 may be followed by block 716. Alternatively, optional block 714 may loop back to block 712 to locate another guest kernel function of interest.

In block 716, hypervisor 118 resumes the virtual processor of VM 120. Block 716 may be followed by block 718.

In block 718, hypervisor 118 monitors for any breakpoint instruction. Block 718 may be followed by block 720.

In block 720, hypervisor 118 determines if a breakpoint instruction is detected. If so, block 720 may be followed by block 722. Otherwise block 720 may loop back to block 718.

In block 722, hypervisor 118 determines the guest context by examining the guest physical memory and guest registers. For example, hypervisor 118 may determine which process called the guest kernel function and correspond that process to contemporary network packets, disk reads, or disk writes. Block 722 may loop back to block 718 to detect another breakpoint instruction.

Figure 8:
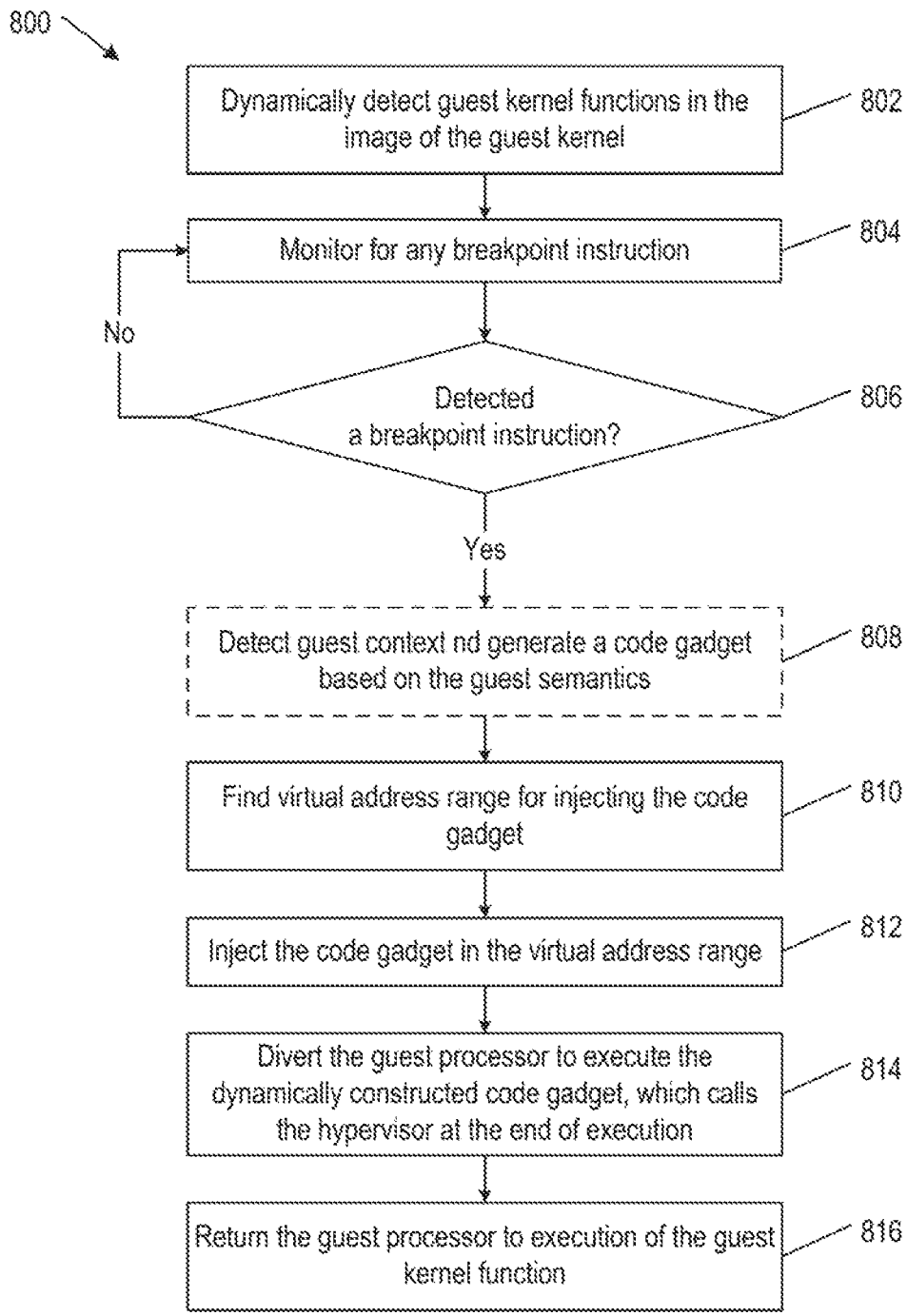
FIG. 8 is a block diagram illustrating a flowchart of a method for the VMI hypervisor of FIG. 1 to dynamically construct and inject code gadgets in a guest in some examples of the present disclosure.

FIG. 8 is a block diagram illustrating a flowchart of a method 800 for hypervisor 118 (FIG. 1) to run dynamic code gadgets in VM 120 (FIG. 1) on an as-needed basis in some examples of the present disclosure. Method 800 may be a continuation of method 600 (FIG. 6). Method 800 may begin in block 802.

In block 802, hypervisor 118 dynamically detects guest kernel functions of interest in guest kernel image 300 (FIG. 3). Block 802 may correspond to blocks 610 and 612 of method 600 when method 800 is a continuation of method 600. Block 802 may be followed by block 804.

In block 804, hypervisor 118 monitors for any breakpoint instruction. Block 804 may be followed by block 806.

In block 806, hypervisor 118 determines if a breakpoint instruction is detected. If so, block 806 may be followed by optional block 808. Otherwise block 806 may loop back to block 804. Blocks 804 and 806 may correspond to blocks 618 and 620 of method 600 when method 800 is a continuation of method 600.

In optional block 808, hypervisor 118 determines guest context and then generates a code gadget based on the guest semantics. Hypervisor 118 may determine the guest context by examining guest physical memory and guest registers. Block 808 may be followed by optional block 810.

In block 810, hypervisor 118 finds, allocates, or receives a virtual address range for injecting the code gadget. Block 810 may be followed by block 812.

In block 812, hypervisor 118 injects the code gadget in the virtual address range. Block 812 may be followed by block 814.

In block 814, hypervisor 118 diverts the virtual processor of VM 120 (FIG. 1) to execute the code gadget, which calls the hypervisor at the end of execution. Block 814 may be followed by block 816.

In block 816, hypervisor 118 returns the guest process of VM 120 to execute the guest kernel function detected with the breakpoint instruction.

Figure 9:
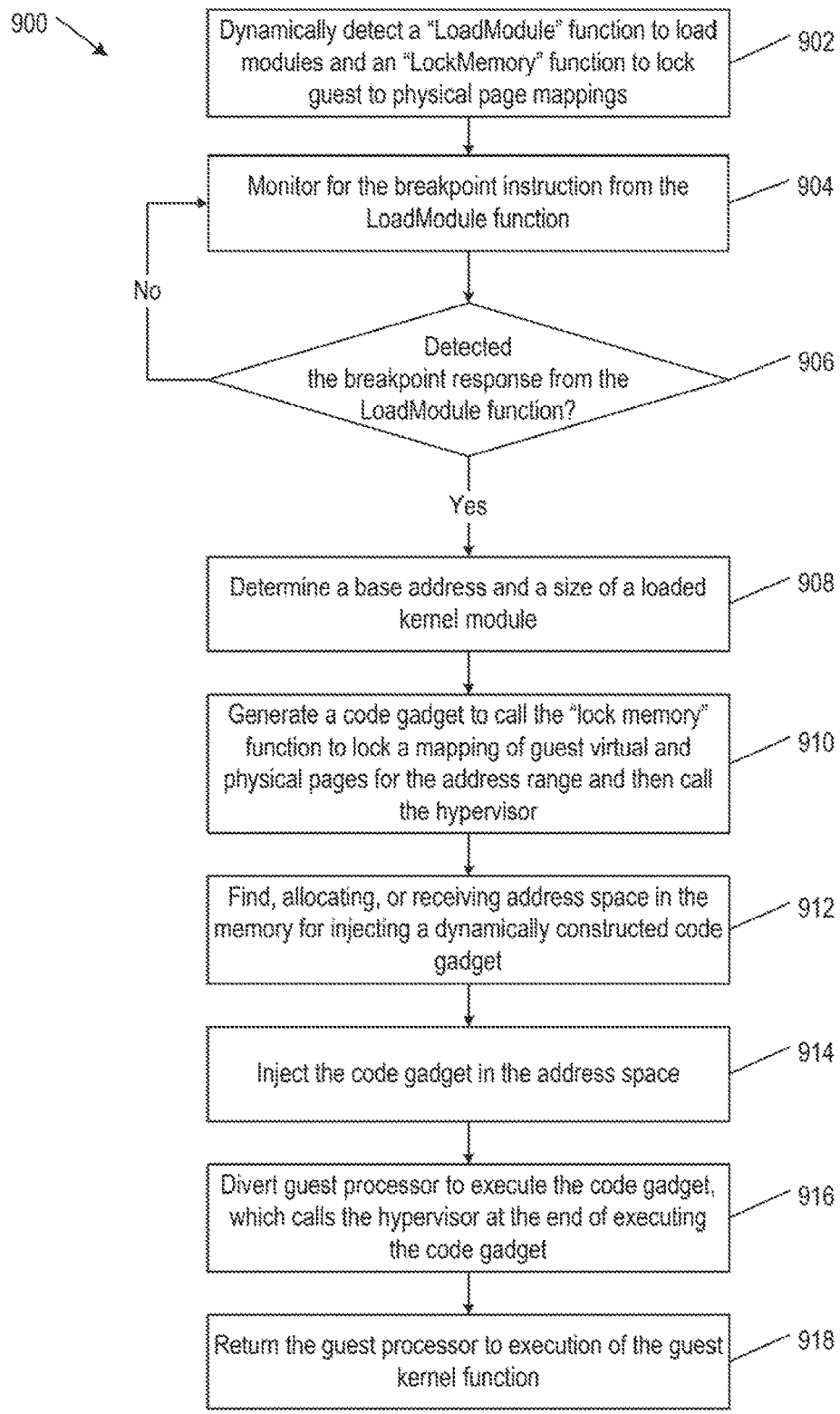
FIG. 9 is a block diagram illustrating a flowchart of a method that is an implementation of the method of FIG. 8 in some examples of the present disclosure.

FIG. 9 is a block diagram illustrating a flowchart of a method 900 for hypervisor 118 (FIG. 1) to run dynamic code gadgets in VM 120 (FIG. 1) in some examples of the present disclosure. Method 900 illustrates one implementation of method 800 (FIG. 8). Method 900 may be a continuation of method 700 (FIG. 7). Method 900 may begin in block 902.

In block 902, hypervisor 118 dynamically detects the LockMemory function and the LoadModule function in guest kernel image 300 (FIG. 3). For the LoadModule function, hypervisor 118 inserts a breakpoint instruction. Block 902 may correspond to blocks 712 and 714 of method 700 when method 900 is a continuation of method 700. Block 902 may be followed by block 904.

In block 904, hypervisor 118 monitors for the breakpoint instruction on the LoadModule function. Receiving the breakpoint instruction would mean a process s loading a new guest kernel module to guest kernel 122. Block 904 may be followed by block 906.

In block 906, hypervisor 118 determines if the breakpoint instruction on the LoadModule function is detected. If so, block 906 may be followed by block 908. Otherwise block 906 may loop back to block 904. Blocks 904 and 906 may correspond to blocks 720 and 722 of method 700 (FIG. 7) when method 900 is a continuation of method 700.

In block 908, hypervisor 118 determines a base address and a size of the new guest kernel module. Hypervisor 118 may determine the base address and the size of the new module by examining guest physical memory and guest registers. Block 908 may be followed by block 910.

In block 910, hypervisor 118 generates a parameter block 504 (FIG. 5) and a code gadget 502 (FIG. 5) to call the LockMemory function. Parameter block 504 identifies the address of the LockMemory function and the new guest kernel module's base address and size as parameters for the LockMemory function. Code gadget 502 causes the virtual processor of VM 120 to execute instructions at the address in the parameter block with the parameters in the parameter block, which causes the virtual processor of VM 120 to lock the guest physical pages with the code of the new module and then hypercall the hypervisor with the result at the end of execution. Block 910 may be followed by block 912.

In block 912, hypervisor 118 finds, allocates, or receives a virtual address range for injecting parameter block 504 and code gadget 502. In one example, hypervisor 118 finds unused space in code sections 310 (FIG. 3) in guest kernel image 300 (FIG. 3). If the unused code space is not sufficiently large, hypervisor 118 may inject a small code gadget in unused code space. This code gadget allocates a virtual address range in the guest virtual memory using OS APIs, and hypervisor 118 uses that allocated virtual address range for parameter block 504 and code gadget 502.

In another example, guest kernel 122 includes an early load agent that allocates a virtual address range, informs the hypervisor 118 about it, and immediately exits. Hypervisor 118 uses this virtual address range for parameter block 504 and code gadget 502.

In an additional example, hypervisor 118 reserves certain guest physical pages so they are invisible to VM 120. When injecting a code gadget, hypervisor 118 maps the invisible guest physical pages into guest page tables, injects parameter block 504 and code gadget 502 in these pages, executes the gadget, and un-maps these pages from the guest page tables.

Block 912 may be followed by block 914.

In block 914, hypervisor 118 injects parameter block 504 and code gadget 502 in the virtual address range. Block 916 may be followed by block 918.

In block 916, hypervisor 118 diverts the virtual processor of VM 120 to execute the code gadget, which calls the hypervisor at the end of execution. Block 916 may be followed by block 918.

In block 918, hypervisor 118 returns the guest process of VM 120 to execute the LoadModule function.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for a hypervisor to perform virtual machine introspection, comprising:
    monitoring for an initialization of a guest kernel running on a virtual machine implemented by the hypervisor; and
    when the initialization of the guest kernel is detected:
        pausing a virtual processor of the virtual machine;
        locating a guest kernel image of the guest kernel in guest memory;
        locating a kernel function in the guest kernel image;
        inserting a breakpoint on the kernel function;
        after inserting the breakpoint, resuming the virtual processor;
        monitoring for a breakpoint instruction; and
        when the breakpoint instruction is detected, gathering guest context by examining the guest memory and guest registers.

2. The method of claim 1, wherein monitoring for the initialization of the guest kernel comprises monitoring for an instruction executed by the guest kernel during the initialization.

3. The method of claim 2, wherein the instruction comprises a load interrupt descriptor table (LIDT) instruction or a write to model specific register (WRMSR) instruction.

4. The method of claim 1, wherein said locating the guest kernel image in the guest memory comprises:

determining an address registered by the guest kernel; and
parsing the memory upward from the registered address to locate a header comprising a base address and a size of the guest kernel.

5. The method of claim 4, wherein the registered address comprises an interrupt handler address in an interrupt descriptor table (IDT) or a system call handler address in a model-specific register (MSR).

6. The method of claim 1, wherein said locating the guest kernel function comprises one of:
parsing an export table in the guest kernel image to locate an address of the guest kernel function;
parsing a code section in the image for a pattern of the guest kernel function; and
using a symbol server to locate the guest kernel function in the image.

7. The method of claim 1, wherein said inserting the breakpoint comprises inserting a hidden breakpoint, which causes the hypervisor to present one physical page for a read path and another physical page for an execute path.

8. The method of claim 1, further comprising, after detecting the breakpoint instruction:
pausing the virtual processor;
constructing a code gadget configured to run in the virtual machine;
injecting the code gadget in a virtual address range in the guest memory;
diverting the virtual processor to execute the code gadget, which causes the virtual processor to call the hypervisor at the end of executing the code gadget; and
returning the virtual processor to execute the guest kernel function.

9. The method of claim 8, further comprising finding an empty virtual address range by locating unused code space in the guest kernel image.

10. The method of claim 8, further comprising allocating the virtual address range by locating unused code space in the guest kernel image and injecting a code gadget in the unused code space to call a guest API to allocate the virtual address range that may be subsequently used for other code gadgets.

11. The method of claim 8, further comprising receiving a notification of the virtual address range from an agent in the virtual machine, the agent being configured to allocate the virtual address range and notify the hypervisor of the virtual address range.

12. The method of claim 8, further comprising:
reserving a guest physical page; and
after constructing and before injecting the code gadget:
mapping the guest physical page into a guest page table to create virtual address range; and
after the virtual processor executes the code gadget, un-mapping the guest physical page from the guest page table.

13. The method of claim 8, wherein the kernel function comprises a load module function, the method further comprises examining the guest memory and guest registers to determine an address and a size of a new module loaded by the load module function.

14. The method of claim 13, wherein the code gadget is configured to call a guest operating system API to lock guest physical pages corresponding to the code of the new module.

15. A non-transitory, computer-readable storage medium encoded with instructions executable by a processor to perform virtual machine introspection, the instructions comprising:
monitoring for an initialization of a guest kernel running on a virtual machine implemented by the hypervisor; and
when the initialization of the guest kernel is detected:
pausing a virtual processor of the virtual machine;
locating a guest kernel image of the guest kernel in guest memory;
locating a kernel function in the guest kernel image;
inserting a breakpoint on the kernel function;
after inserting the breakpoint, resuming the virtual processor;
monitoring for a breakpoint instruction; and
when the breakpoint instruction is detected, gathering guest context by examining the guest memory and guest registers.

16. The storage medium of claim 15, wherein said locating the guest kernel image in the guest memory comprises:
determining an address registered by the guest kernel; and
parsing the memory upward from the registered address to locate a header comprising a base address and a size of the guest kernel.

17. The storage medium of claim 15, wherein said locating the guest kernel function comprises one of:
parsing an export table in the guest kernel a e to locate an address of the guest kernel function;
parsing a code section in the image for a pattern of the guest kernel function; and
using a symbol server to locate the guest kernel function in the image.

18. The storage medium of claim 15, wherein the instructions further comprise:
pausing the virtual processor;
constructing a code gadget configured to run in the virtual machine;
injecting the code gadget in a virtual address range in the guest memory;
diverting the virtual processor to execute the code gadget, which causes the virtual processor to call the hypervisor at the end of executing the code gadget; and
returning the virtual processor to execute the guest kernel function.

19. The storage medium of claim 18, wherein:
the kernel function comprises a load module function;
the method further comprises determining an address and a size of a new module loaded by the load module function; and
the code gadget is configured to call a guest operating system API to lock guest physical pages with code of the new module.

20. A computer system, comprising:
a main memory;
a secondary memory storing code for a hypervisor;
a processor configured to load the code from secondary memory to main memory and executing the code to:
monitor for an initialization of a guest kernel running on a virtual machine implemented by the hypervisor; and
when the initialization of the guest kernel is detected:
pause a virtual processor of the virtual machine;
locate a guest kernel image of the guest kernel in guest memory;
locate a kernel function in the guest kernel image;
insert a breakpoint on the kernel function;
after inserting the breakpoint, resume the virtual processor;
monitor for a breakpoint instruction; and
after detecting the breakpoint instruction:

gather guest context by examining the guest memory and guest registers;
pause the virtual processor;
construct a code gadget configured to run on the virtual machine;
inject the code gadget in a virtual address range in the guest memory;
divert the virtual processor to execute the code gadget, which causes the virtual processor to call the hypervisor at the end of executing the code gadget; and
return the virtual processor to execute the guest kernel function.

* * * * *